(12) United States Patent
Kabasawa

(10) Patent No.: US 11,346,349 B2
(45) Date of Patent: May 31, 2022

(54) VACUUM PUMP, MAIN SENSOR, AND THREAD GROOVE STATOR

(71) Applicant: Edwards Japan Limited, Chiba (JP)

(72) Inventor: Takashi Kabasawa, Chiba (JP)

(73) Assignee: Edwards Japan Limited, Chiba (JP)

( * ) Notice: Subject to any disclaimer, the term of this patent is extended or adjusted under 35 U.S.C. 154(b) by 209 days.

(21) Appl. No.: 16/495,296

(22) PCT Filed: Mar. 2, 2018

(86) PCT No.: PCT/JP2018/008139
§ 371 (c)(1),
(2) Date: Sep. 18, 2019

(87) PCT Pub. No.: WO2018/173704
PCT Pub. Date: Sep. 27, 2018

(65) Prior Publication Data
US 2020/0095998 A1 Mar. 26, 2020

(30) Foreign Application Priority Data
Mar. 23, 2017 (JP) .............................. JP2017-057192

(51) Int. Cl.
*F04D 19/00* (2006.01)
*G01B 7/06* (2006.01)
*F04D 19/04* (2006.01)

(52) U.S. Cl.
CPC ........... *F04D 19/00* (2013.01); *F04D 19/046* (2013.01); *G01B 7/08* (2013.01)

(58) Field of Classification Search
None
See application file for complete search history.

(56) References Cited

U.S. PATENT DOCUMENTS

| 4,766,369 | A | 8/1988 | Weinstein |
| 9,453,510 | B2 * | 9/2016 | Kawanishi ............ F04D 19/044 |

(Continued)

FOREIGN PATENT DOCUMENTS

| CN | 106415020 A | 2/2017 |
| JP | S60217982 A | 10/1985 |

(Continued)

OTHER PUBLICATIONS

Communication dated Nov. 17, 2020 and Search Report dated Nov. 9, 2020 for corresponding European application Serial No. EP18771283, 10 pages.

(Continued)

*Primary Examiner* — Peter J Bertheaud
*Assistant Examiner* — Geoffrey S Lee
(74) *Attorney, Agent, or Firm* — Theodore M. Magee; Westman, Champlin & Koehler, P.A.

(57) ABSTRACT

A vacuum pump includes: a rotating portion and a stator portion between which an internal flow path is formed; an exhaust mechanism which sends gas from a suction port toward an outlet port through the internal flow path; and a main sensor for detecting that a deposited material has reached a prescribed thickness at a detection object position of the internal flow path, wherein the main sensor includes at least a pair of electrodes disposed in the internal flow path at an interval corresponding to the prescribed thickness, and a capacitance detection circuit which is connected to the pair of electrodes and which detects a capacitance between the pair of electrodes, and the capacitance detection circuit detects that a deposited material in the internal flow path has reached the prescribed thickness on the basis of a drop in an increase rate of the capacitance.

14 Claims, 9 Drawing Sheets

(56) References Cited

U.S. PATENT DOCUMENTS

2006/0152380 A1* 7/2006 Anderson ............ G01L 27/007
                                                    340/679
2017/0176165 A1   6/2017 Kim

FOREIGN PATENT DOCUMENTS

| | | |
|---|---|---|
| JP | H05172091 U | 7/1993 |
| JP | 06101655 A * | 4/1994 |
| JP | H06101655 A | 4/1994 |
| JP | H06109409 A | 4/1994 |
| JP | H078590 U | 2/1995 |
| JP | H1123511 A | 1/1999 |
| WO | WO-2012077411 A1 * | 6/2012 ........... F04D 19/042 |
| WO | 2012077411 A1 | 5/2014 |

OTHER PUBLICATIONS

PCT International Search Report dated Jun. 5, 2018 for corresponding PCT Application No. PCT/JP2018/008139.
PCT International Written Opinion dated Jun. 5, 2018 for corresponding PCT Application No. PCT/JP2018/008139.

* cited by examiner (a)
(b)
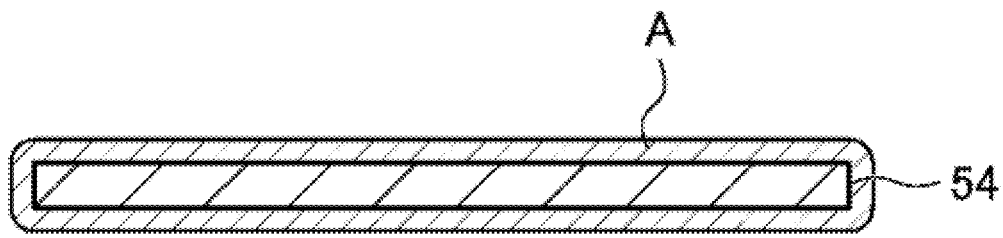
(c)
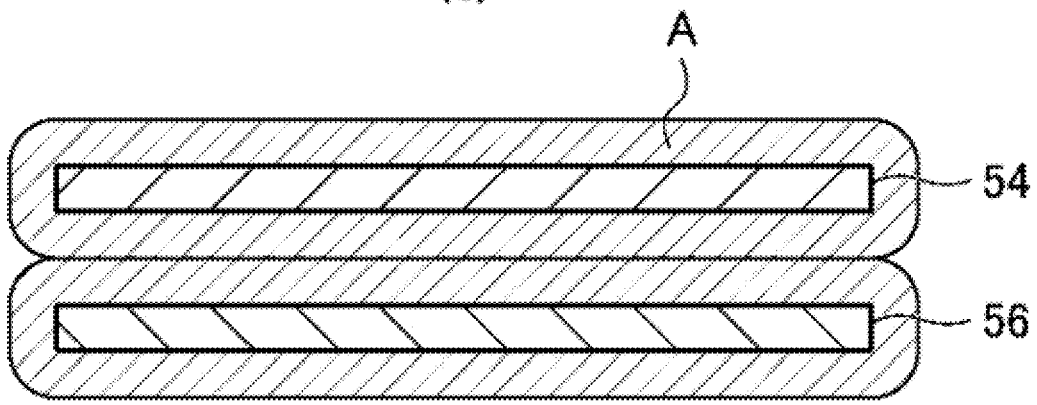
FIG. 6

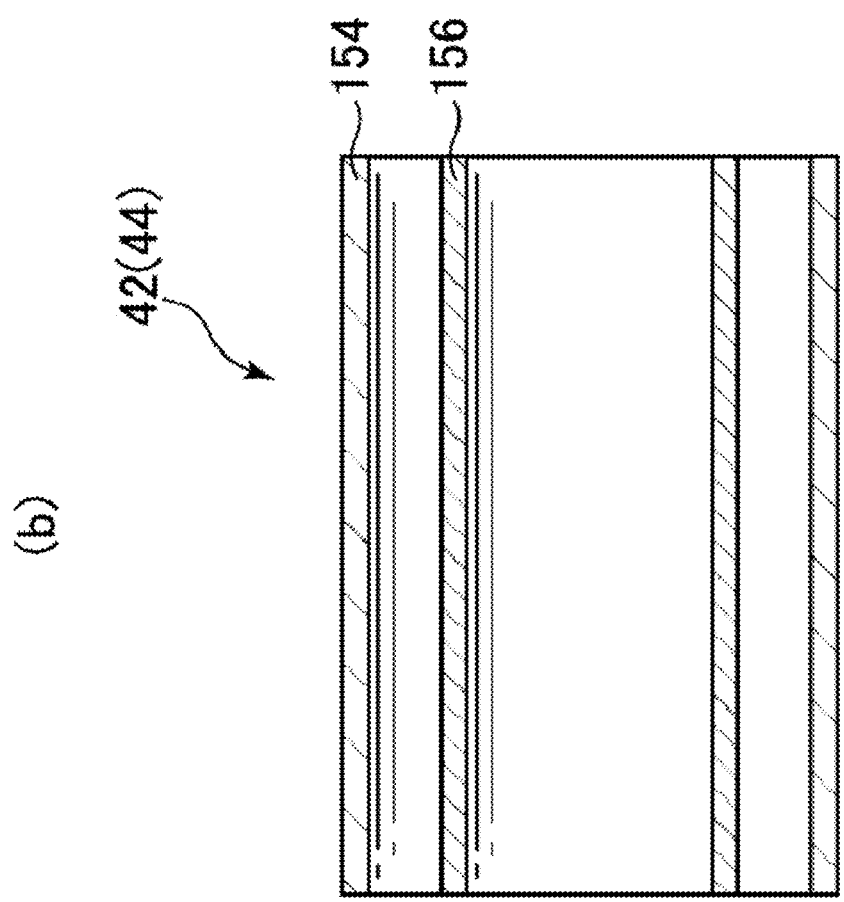
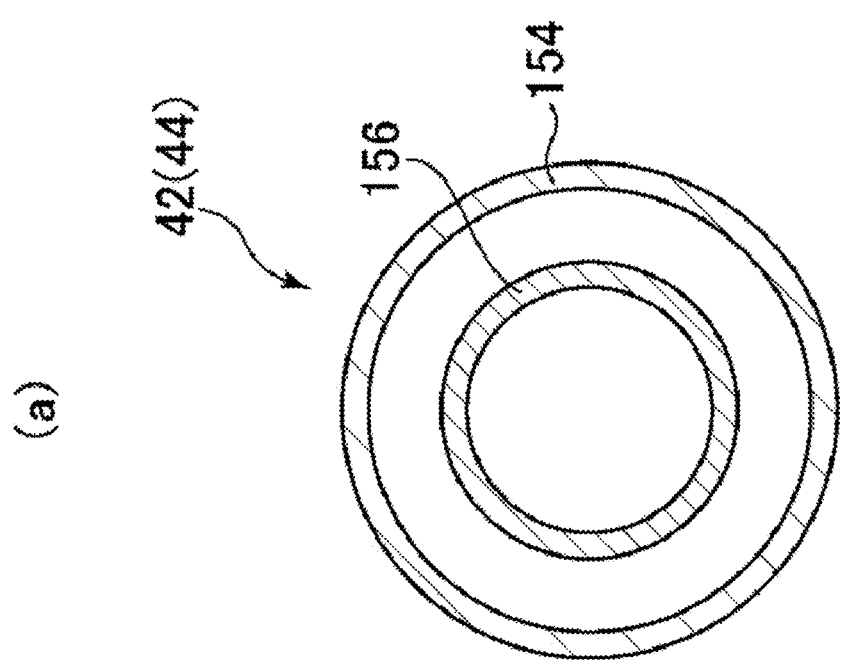
FIG. 9

VACUUM PUMP, MAIN SENSOR, AND THREAD GROOVE STATOR

CROSS-REFERENCE OF RELATED APPLICATION

This application is a Section 371 National Stage Application of International Application No. PCT/JP2018/008139, filed Mar. 2, 2018, which is incorporated by reference in its entirety and published as WO 2018/173704 A1 on Sep. 27, 2018 and which claims priority of Japanese Application No. 2017-057192, filed Mar. 23, 2017.

BACKGROUND

The present invention relates to a main sensor for detecting that deposited materials have reached a prescribed thickness, a vacuum pump having the main sensor, and a thread groove stator of the vacuum pump.

When a semiconductor manufacturing apparatus manufactures a semiconductor, a reactive substance in powder form and a gaseous reaction raw material are exhausted from a reactor by a vacuum pump. The reactive substance and the like exhausted from the reactor travel along a flow path inside the vacuum pump but, in doing so, the reactive substance and the like are deposited on a wall surface of the flow path. When such a deposit is accumulated in a large amount, a flow of gas inside the vacuum pump may be disturbed or the deposit may collide with and damage a rotating portion.

In consideration thereof, for example, Japanese Patent Application Laid-open No. H6-101655 and Japanese Patent Application Laid-open No. H06-109409 disclose a vacuum pump which has a capacitance type film thickness sensor provided in a flow path thereof and which enables a film thickness of a deposit having been deposited on a wall surface of the flow path to be measured by the sensor so that maintenance of an interior of the vacuum pump can be performed in advance before operation is disrupted. The capacitance type film thickness sensor includes one pair or a plurality of pairs of electrodes and a detecting apparatus which detects a capacitance between the electrodes. When a deposit accumulates on a surface of the electrodes, the capacitance between the electrodes varies in accordance with a relative permittivity of the deposit. Therefore, the capacitance between the electrodes that form a pair is detected by the detecting apparatus and a thickness of the deposit is estimated on the basis of the capacitance.

The discussion above is merely provided for general background information and is not intended to he used as an aid in determining the scope of the claimed subject matter. The claimed subject matter is not limited to implementations that solve any or all disadvantages noted in the background.

SUMMARY

Relative permittivity differs from one chemical to the next. With the capacitance type film thickness sensor described above, since the thickness of a deposit is estimated using the relative permittivity of the deposit, a chemical composition of the deposit must be specified in order to estimate a thickness of the deposit in an accurate manner. However, raw materials and the like used to manufacture semiconductors differ among semiconductors. Therefore, the chemical composition of a deposit that is deposited in the flow path inside the pump is not constant and accurately specifying the chemical composition of the deposit is difficult. As a result, with the capacitance type film thickness sensor described in Japanese Patent Application Laid-open No. H06-101655 and Japanese Patent Application Laid-open No. H06-109409, the thickness of a deposit cannot be estimated in an accurate manner and, consequently, it is difficult to detect that the deposit has accumulated to a prescribed thickness in a flow path.

The present invention has been made in consideration of the problem described above, and an object thereof is to provide a vacuum pump including a sensor capable of detecting that, even when a chemical composition of a deposit inside a flow path cannot be specified, the deposit has accumulated to a prescribed thickness in the flow path.

The vacuum pump according to the present invention includes: a rotating portion and a stator portion between which an internal flow path is formed; an exhaust mechanism. which sends gas from a suction port toward an outlet port through the internal flow path; and a main sensor for detecting that a deposited material has reached a prescribed thickness at a detection object position of the internal flow path, wherein the main sensor includes at least a pair of electrodes disposed in the internal flow path at an interval corresponding to the prescribed thickness, and a capacitance detection circuit which is connected to the pair of electrodes and which detects a capacitance between the pair of electrodes, and the capacitance detection circuit detects that a deposited material in the internal flow path has reached the prescribed thickness on the basis of a drop in an increase rate of the capacitance.

When a gap is present between deposits accumulated on the pair of electrodes constituting the main sensor (in other words, when a space between the pair of electrodes is not filled by the deposits), the capacitance increases as the vacuum pump is driven and the deposited material of each electrode accumulates. In comparison, when the space between the pair of electrodes constituting the main sensor is filled by the deposits and the gap is no longer present, the capacitance between the electrodes hardly increases even when the vacuum pump is driven. Therefore, according to the present invention configured as described above, a creation of a state where the space between the pair of electrodes is filled by deposited materials can be detected by detecting that the increase rate of the capacitance has dropped and, accordingly, it can be detected that the deposited materials inside the internal flow path have reached the prescribed thickness regardless of a chemical composition of the deposited materials.

In the present invention, preferably, the interval of the electrodes is set to one to two times an interval between the rotating portion and the stator portion at the detection object position.

Since a deposited material accumulates on the surface of each electrode, at a time point where the increase rate of the capacitance has dropped, it can be estimated that the deposited material has accumulated on each electrode to a thickness that is half the distance between the electrodes. Therefore, when simply detecting whether or not the space between the rotating portion and the stator portion of the electrodes is blocked, the interval of the electrodes may conceivably be set to twice the interval between the rotating portion and the stator portion at the detection object position. However, once a deposit accumulates to such an extent that the space between the rotating portion and the stator portion is blocked, there is a risk that the rotating portion may sustain damage from the deposit. In comparison, according to the present invention configured as described above, since the interval between the electrodes is set to one to two times the interval between the rotating portion and the stator portion at the detection object position, it can be detected that the deposited material has accumulated to the prescribed thickness before the space between the rotating portion and the stator portion is blocked.

In the present invention, preferably, the pair of electrodes have a flat plate shape and are disposed in parallel.

According to the present invention configured as described above, it can be determined that the thickness of the deposited material having accumulated between the flat plate-shaped electrodes has reached the prescribed thickness.

In the present invention, preferably, the pair of electrodes have a cylindrical shape and are disposed concentrically and coaxially.

According to the present invention configured as described above, it can be determined that the thickness of the deposited material having accumulated between the cylindrical electrodes has reached the prescribed thickness.

In the present invention, preferably, the main sensor is disposed inside an outlet port-side flow path which connects an outlet of the exhaust mechanism and an outlet port of the vacuum pump to each other.

A deposit is most likely to accumulate between the outlet of the exhaust mechanism and the outlet port of the vacuum pump. Therefore, according to the present invention configured as described above, by providing the main sensor at a location where the deposit is most likely to accumulate, failures caused by accumulation of the deposit can be reliably prevented.

In the present invention, preferably, the main sensor is disposed at a portion farthest from the outlet port of the vacuum pump in the outlet port-side flow path.

A deposit accumulates in the portion farthest from the outlet port of the vacuum pump in the outlet port-side flow path. Therefore, according to the present invention configured as described above, by providing the main sensor at a location where the deposit is most likely to accumulate, failures caused by accumulation of the deposit can be reliably prevented.

In the present invention, preferably, the pair of electrodes are disposed so as to extend in a flow direction of gas that flows inside the internal flow path.

According to the present invention configured as described above, gas flows smoothly between the electrodes and the sensor can be prevented from interrupting the flow of the gas.

In the present invention, preferably, the exhaust mechanism includes a thread groove pump in a rearmost stage thereof, and a gas vent hole is provided in a vicinity of an outlet of the thread groove pump.

Pressure rises in the vicinity of the outlet of the thread groove pump. Since a deposit is more likely to be deposited at a location with high pressure, the thickness of a deposit cannot be accurately detected if there is a large difference in pressure between the detection object position and a position where the main sensor is provided. In comparison, according to the present invention configured as described above, since the gas vent hole is provided in the vicinity of the outlet of the thread groove pump, the difference in pressure between the vicinity of the outlet of the thread groove pump and the position where the main sensor is provided can be reduced and the thickness of a deposit can be detected with greater accuracy.

In the present invention, preferably, the vacuum pump further has an auxiliary sensor including a pair of electrodes which are disposed inside the internal flow path and which are connected to the capacitance detection circuit, wherein an interval between the pair of electrodes of the auxiliary sensor is set shorter than the interval between the pair of electrodes of the main sensor.

According to the present invention configured as described above, a relative permittivity (permittivity) of a deposit can be obtained on the basis of a capacitance at a time point where a space in the auxiliary sensor is filled with the deposit, and the thickness of a deposit accumulated on the electrodes of the main sensor can be estimated on the basis of the relative permittivity of the deposit and the capacitance between the electrodes of the main sensor.

In the present invention, preferably, the vacuum pump is configured such that an applied voltage between the pair of electrodes of the main sensor is equal to or lower than 100 V.

According to Paschen's Law, there is a risk that an electrical discharge may occur under pressure inside the flow path of the vacuum pump when the applied voltage between the electrodes exceeds 100 V. in comparison, according to the present invention configured as described above, since the applied voltage between the electrodes is equal to or lower than 100 V, an occurrence of an electrical discharge between the electrodes can be prevented.

In the present invention, preferably, an insulating layer is formed on a surface of the pair of electrodes of the main sensor.

According to the present invention configured as described above, even if a conducting substance accumulates on the surface of the electrodes, a short circuit can be prevented from occurring between the electrodes.

In the present invention, preferably, the capacitance detection circuit and the pair of electrodes of the main sensor are only energized during detection.

A reactive substance in powder form and a gaseous reaction raw material may become charged, and a deposit is likely to accumulate on electrodes charged to an opposite charge. In comparison, according to the present invention configured as described above, since the electrodes are only charged during detection, a particle can be prevented from becoming more likely to accumulate on the electrodes.

A main sensor according to the present invention is the main sensor used in the vacuum pump described above.

A thread groove stator according to the present invention is the thread groove stator which is used in the vacuum pump described above and which constitutes a thread groove pump.

According to the present invention, a vacuum pump is provided which includes a sensor capable of detecting that, even when a chemical composition of a deposit inside a flow path is not constant, the deposit has accumulated to a prescribed thickness in the flow path.

The Summary is provided to introduce a selection of concepts in a simplified form that are further described in the Detail Description. This summary is not intended to identify key features or essential features of the claimed subject matter, nor is it intended to be used as an aid in determining the scope of the claimed subject matter.

BRIEF DESCRIPTION OF THE DRAWINGS

FIGS. 6A to 6C are diagrams showing how deposited materials accumulate on a pair of electrodes of the main sensor;

FIGS. 9A and 9B each show a shape of a pair of electrodes of a main sensor according to another embodiment, in which FIG. 9A is a sectional view taken along a plane perpendicular to a central axis and FIG. 9B is a sectional view taken along a plane along the central axis.

DESCRIPTION OF THE PREFERRED EMBODIMENTS

Hereinafter, an embodiment of a vacuum pump according to the present invention will be described in detail with reference to the drawings.

Figure 1:
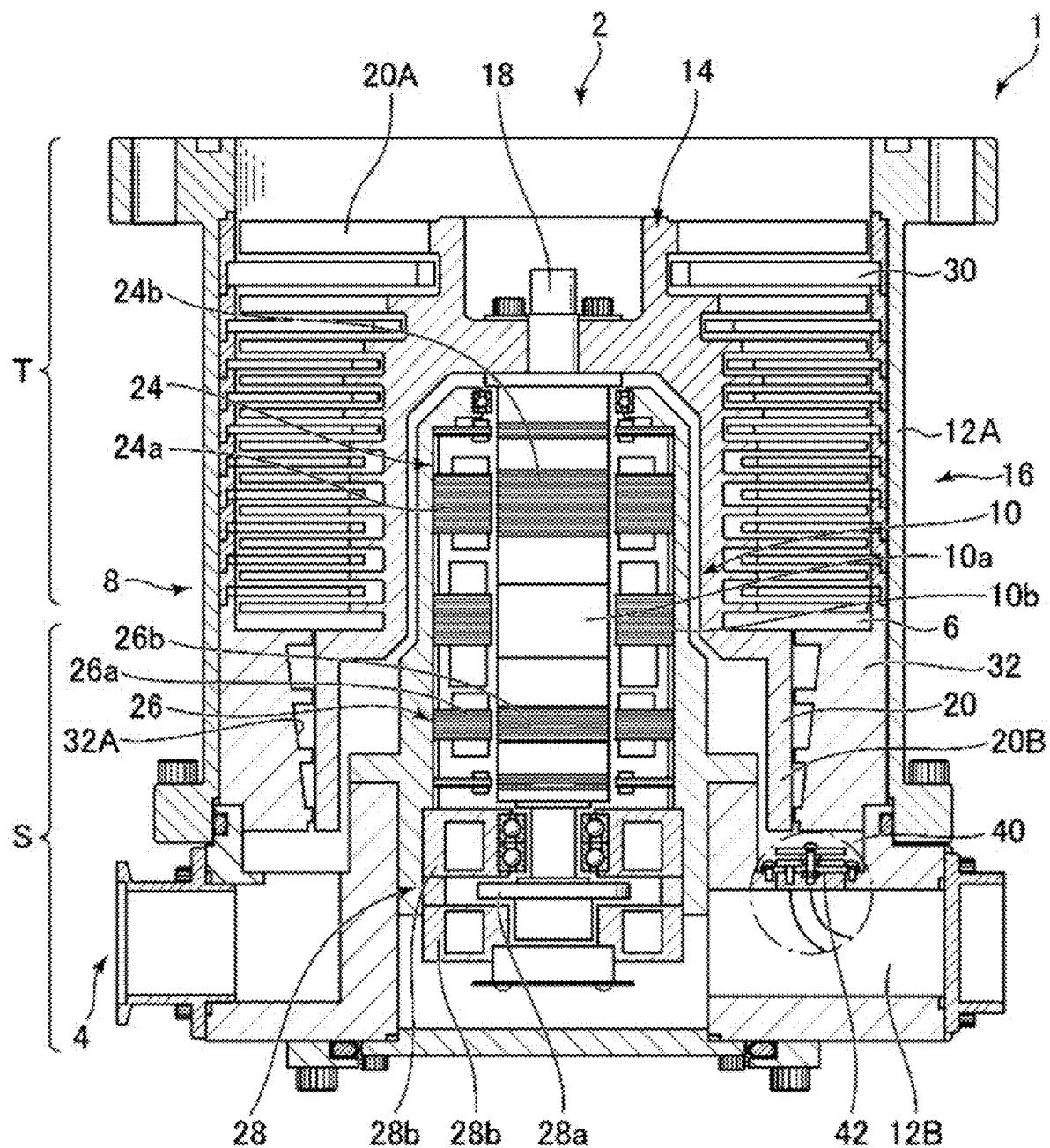
FIG. 1 is a vertical sectional view showing a vacuum pump according to an embodiment of the present invention.

FIG. 1 is a vertical sectional view showing the vacuum pump according to the embodiment of the present invention.

As shown in FIG. 1, a vacuum pump 1 according to the present embodiment has an exhaust mechanism 8 made up of a turbo-molecular pump portion T and a thread groove pump portion S inside a space constituted by a casing 12A and a base 12B, and sends gas from a suction port 2 formed at an apex of the casing 12A toward an outlet port 4 formed in a side portion of the base 12B through an internal flow path 6. The vacuum pump 1 has a rotating portion 14 and a stator portion 16 fixed to the casing 12A inside the space constituted by the casing 12A and the base 12B, and the internal flow path 6 which extends from the suction port 2 to the outlet port 4 is formed between the rotating portion 14 and the stator portion 16.

The rotating portion 14 has a shaft 18 which is rotated by a motor portion 10 and a rotor portion 20 which is fixed to the shaft 18. The rotor portion 20 has a plurality of rotor blades 20A provided on a side of the suction port 2 and a cylindrical portion 20B provided on a side of the outlet port 4. The rotor blades 20A are constituted by blades that extend radially so as to tilt with respect to a plane perpendicular to an axial line of the shaft 18. The cylindrical portion 20B is a portion with a cylindrical shape, and the rotor portion 20 is made of a metal such as stainless steel or an aluminum alloy.

The motor portion 10 is, for example, a brushless DC motor and has a plurality of permanent magnets 10a provided around the shaft 18 and a plurality of electromagnets 10b provided around the permanent magnets 10a. By sequentially switching currents of the electromagnets 10b and generating a rotating magnetic field around the permanent magnets 10a, the permanent magnets 10a follow the rotating magnetic field and cause the shaft 18 to rotate.

In addition, radial bearing portions 24 and 26 which support the shaft 18 in a radial direction are provided above and below the motor portion 10. The radial bearing portions 24 and 26 are made up of a plurality of electromagnets 24a and 26a provided around the shaft 18 and targets 24b and 26b provided at positions of the shaft 18 which oppose the electromagnets 24a and 26a. The radial bearing portions 24 and 26 support the shaft 18 in the radial direction in a contactless manner as the electromagnets 24a and 26a are attracted toward the targets 24b and 26b.

Furthermore, a thrust bearing portion 28 is provided below the radial bearing portion 26. The thrust bearing portion 28 includes an armature disk 28a provided on the shaft 18 and electromagnets 28b provided above and below the armature disk 28a. The thrust bearing portion 28 supports the shaft 18 in a thrust direction in a contactless manner as the armature disk 28a is attracted by magnetic forces of the electromagnets 28b. Moreover, position sensors (not shown) are provided in vicinities of the radial bearing portion 24 and the thrust bearing portion 28, a position of the shaft 18 is detected by the position sensors, and power supplied to the electromagnets 24a, 26a, and 28b of the radial bearing portions 24 and 26 and the thrust bearing portion 28 are controlled so that the shaft 18 moves to a prescribed position.

The stator portion 16 has a stator blade 30 provided on the side of the suction port 2 and a thread groove stator 32 provided on the side of the outlet port 4. The stator blade 30 is constituted by a plurality of blades which are tilted with respect to a plane perpendicular to the axial line of the shaft 18 and which extend from an inner circumferential surface of the casing 12A toward a center thereof. In the turbomolecular pump portion T, the stator blade 30 and the rotor blades 20A are alternately disposed in a vertical direction.

Figure 4:
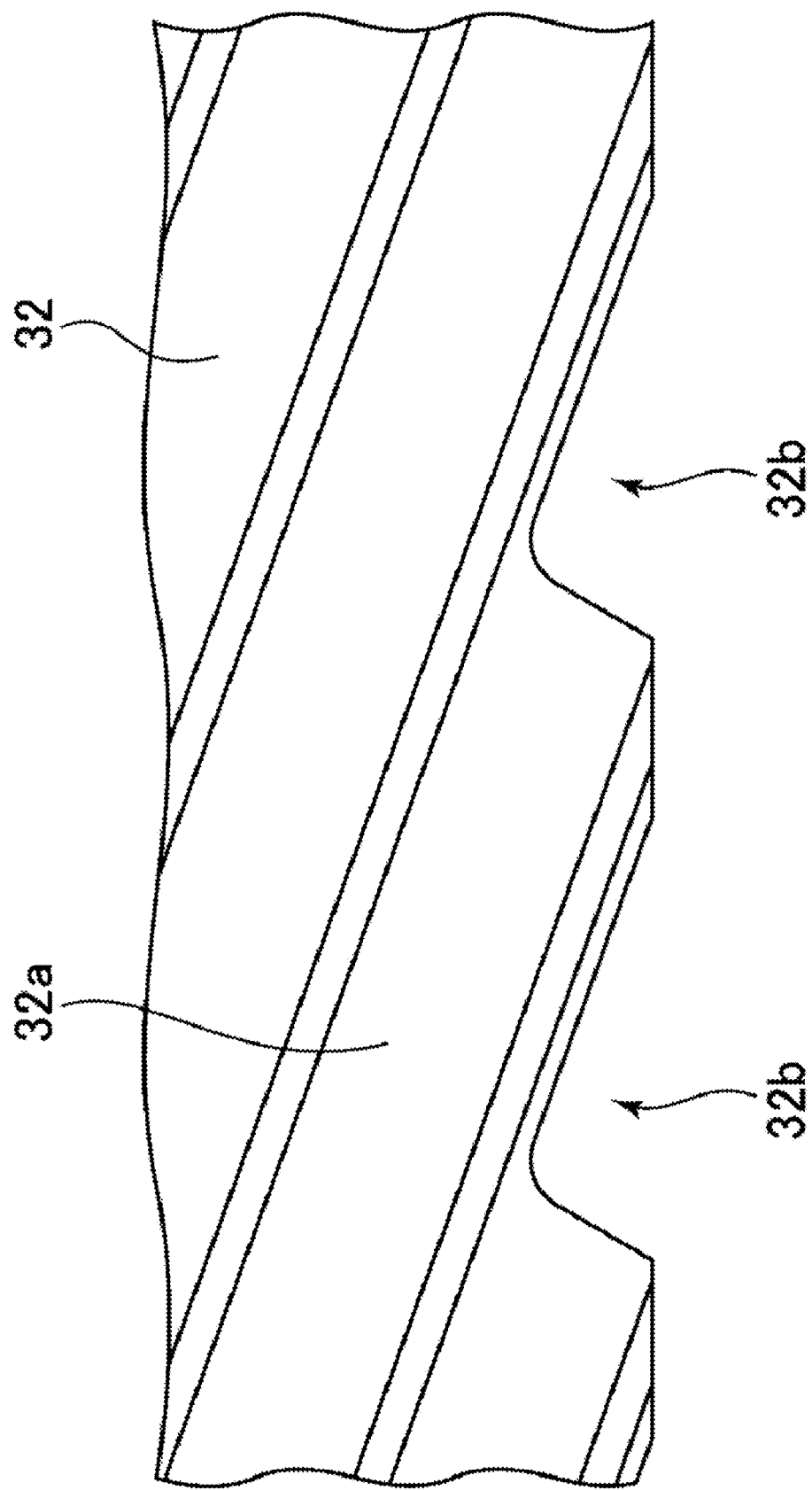
FIG. 4 is a developed view of an outlet port-side end portion of a spiral groove of a thread groove stator of the vacuum pump according to the present embodiment.

The thread groove stator 32 is a cylindrical member having a spiral groove 32a formed on an inner circumferential surface thereof. A depth of the spiral groove 32a gradually decreases from the side of the suction port 2 toward the outlet port 4. FIG. 4 is a developed view of an outlet port-side end portion of the spiral groove of the thread groove stator of the vacuum pump according to the present embodiment. As shown in FIG. 4, a notch 32b as a gas vent hole is formed at an outlet of the spiral groove 32a of the thread groove stator 32 (in other words, a lower edge portion of the thread groove stator 32).

Figure 5:
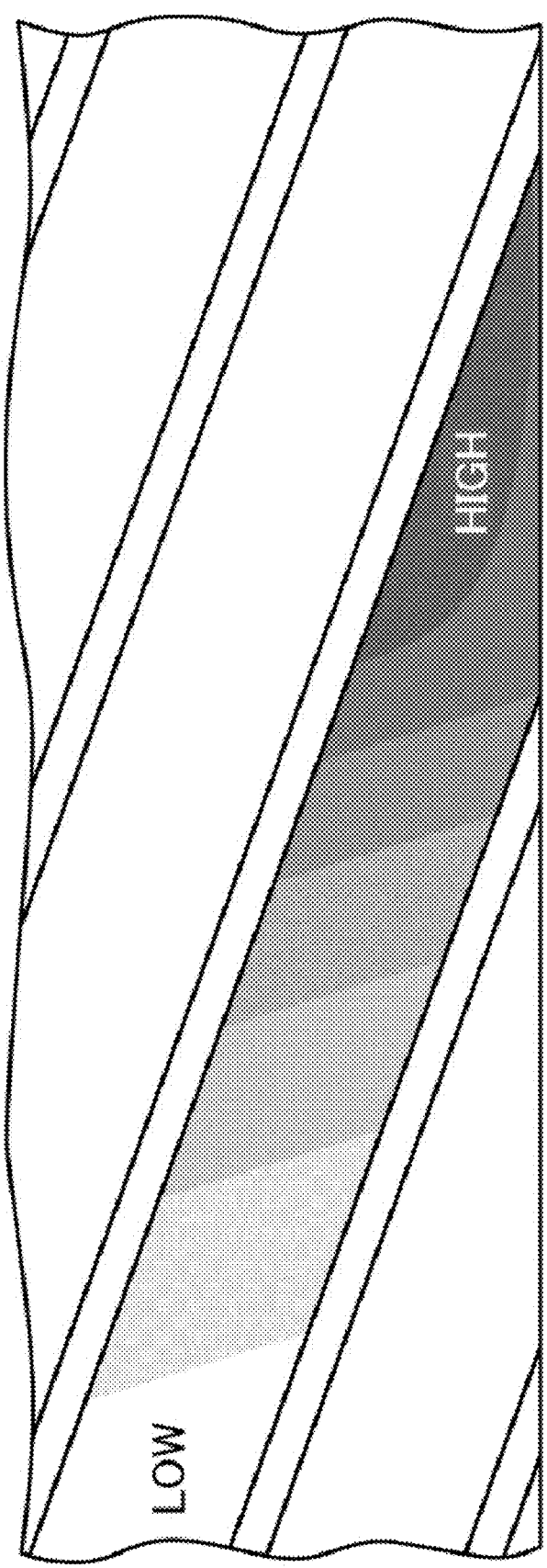
FIG. 5 is a diagram showing a pressure distribution of gas in the spiral groove, when a gas vent hole is not provided at an outlet of the thread groove stator.

FIG. 5 is a diagram showing a pressure distribution of gas in the spiral groove when the gas vent hole is not provided at the outlet of the thread groove stator. As shown in FIG. 5, pressure of gas inside the spiral groove increases as the gas approaches the outlet and, consequently, a high-pressure region is created in a vicinity of the outlet. In comparison, by forming the notch 32b at the outlet of the spiral groove 32a of the thread groove stator 32 as described above, an occurrence of a high-pressure region can be suppressed.

An outlet port-side flow path 40 which connects an outlet of the thread groove pump portion S and the outlet port 4 is formed between a lower surface of the thread groove stator 32 and the base 12B.

Due to the vacuum pump 1 being configured as described above, when the rotating portion 14 is rotated with respect to the stator portion 16 by the motor portion 10, in the turbo-molecular pump portion T of a preceding stage, a gas particle is flicked away by the rotor blades 20A and gas is sent in a direction where the gas passes between the stator blades 30. Subsequently, in the thread groove pump portion 5, the gas is sent while being compressed along the spiral groove 32a of the thread groove stator 32, Accordingly, the gas is sucked into the suction port 2, sent along the internal flow path 6 by the exhaust mechanism 8, and exhausted from the outlet port 4.

In addition, the vacuum pump 1 according to the present embodiment has a detection system for detecting that a deposited material at a detection object position of the internal flow path 6 has reached a prescribed thickness. A main sensor 42 which constitutes the detection system is provided on an opposite side in a horizontal direction to the outlet port 4 of the vacuum pump in the outlet port-side flow path 40 (a portion farthest from the outlet port 4), and an auxiliary sensor (not shown) is provided in a vicinity of the main sensor 42.

Figure 2:
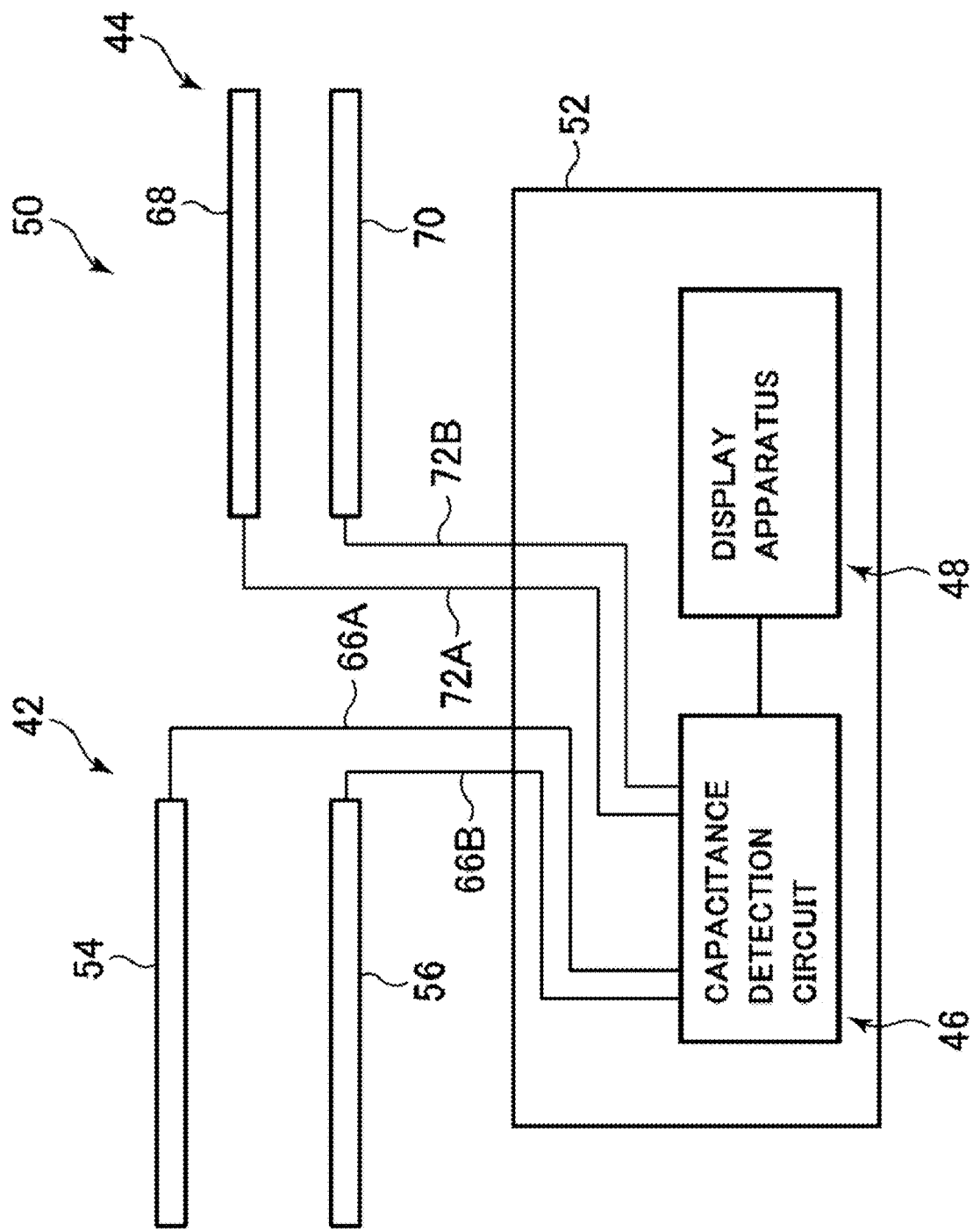
FIG. 2 is a block diagram showing a configuration of a detection system of the vacuum pump according to the present embodiment.

FIG. 2 is a block diagram showing a configuration of the detection system of the vacuum pump according to the present embodiment. As shown in FIG. 2, a detection system 50 has the main sensor 42, an auxiliary sensor 44, and a control apparatus 52. The control apparatus 52 is a calculation processing apparatus such as a PC and has, for example, a display apparatus 48 such as a liquid crystal display. In addition, a capacitance detection circuit 46 is formed inside the control apparatus 52, and the capacitance detection circuit 46 is connected to the display apparatus 48. It should be noted that the auxiliary sensor 44 can be omitted.

Figure 3:
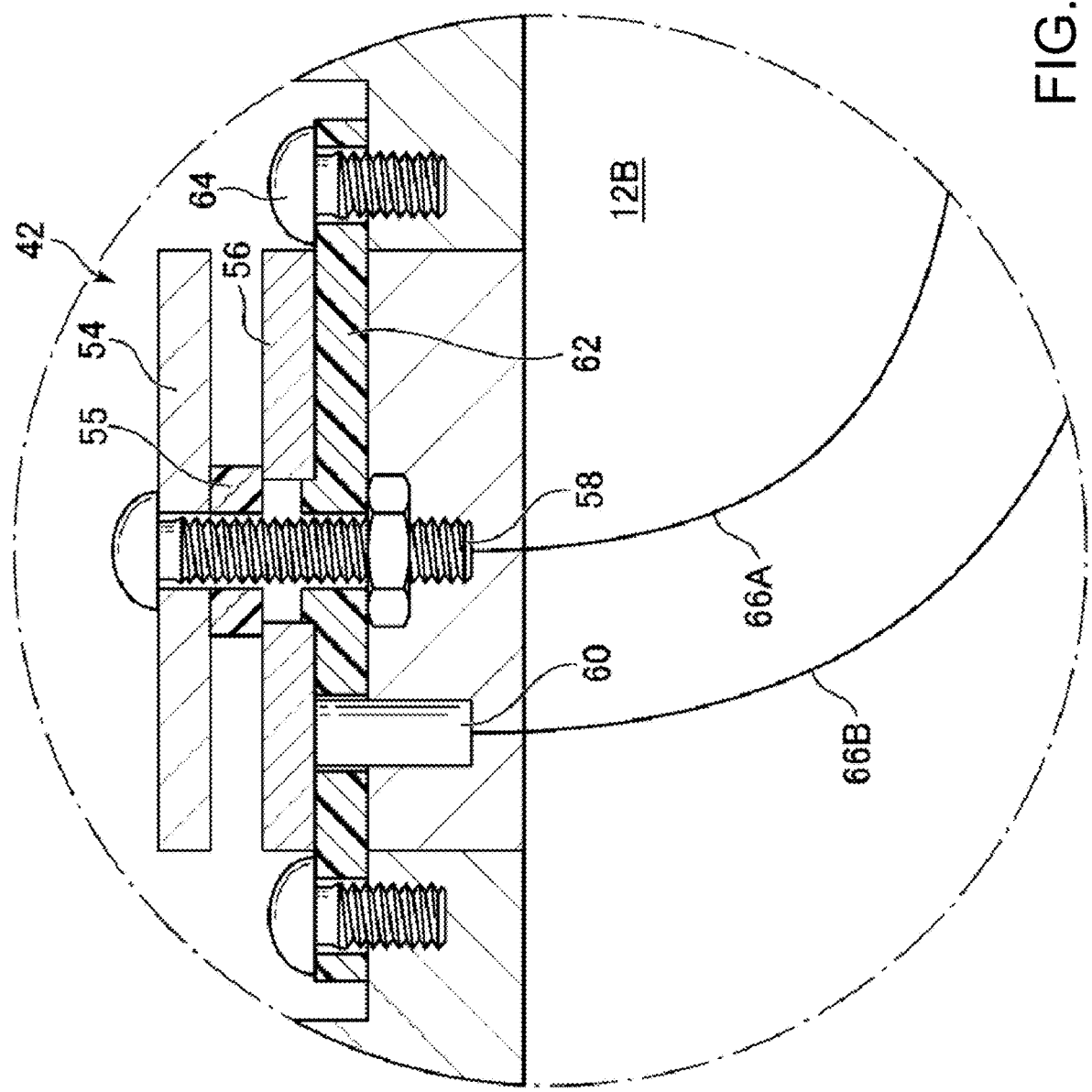
FIG. 3 is a vertical sectional view showing a configuration of a main sensor of the vacuum pump according to the present embodiment.

FIG. 3 is a vertical sectional view showing a configuration of the main sensor of the vacuum pump according to the present embodiment. As shown in FIG. 3, the main sensor 42 has a pair of electrodes 54 and 56 and connectors 58 and 60 connected to each of the electrodes 54 and 56. The lower electrode 56 is horizontally placed on a base plate 62 which is made of an insulating material, and the upper electrode 54 is horizontally supported by a spacer 55 which is made of an insulating material and which is disposed on the lower electrode 56 such that a prescribed interval is provided between the electrodes 54 and 56. In the main sensor 42, the base plate 62 is fixed to the base 12B by a screw 64.

In the outlet port-side flow path 40, gas having passed through the spiral groove 32a of the thread groove stator 32 flows in a circumferential direction. As described above, the electrodes 54 and 56 which constitute the main sensor 42 are horizontally supported and provided in a flow direction of the gas.

The pair of electrodes 54 and 56 are made of metal plates, and an insulating layer made of alumite, PTFE (Teflon (registered trademark)), or the like is formed on surfaces of the electrodes 54 and 56. The connectors 58 and 60 which are embedded in the base 12B are connected to each of the electrodes 54 and 56, and electric wires 66A and 66B which extend from the connectors 58 and 60 are connected to the capacitance detection circuit 46 of the control apparatus 52.

The auxiliary sensor 44 has electrodes 68 and 70, and a configuration of the auxiliary sensor 44 is the same as that of the main sensor 42 with the sole difference from the main sensor 42 being a distance, between the electrodes. Electric wires 72A and 72B connected to the electrodes 68 and 70 are connected to the capacitance detection circuit 46 of the control apparatus 52.

The capacitance detection circuit 46, which is a circuit for detecting a capacitance between a pair of electrodes, measures a cumulative drive time t of the vacuum pump 1 and, every time a drive time $\Delta t$ elapses, measures capacitances $C_m(t)$ and $C_s(t)$ of the main sensor 42 and the auxiliary sensor 44. In addition, on the basis of the capacitances $C_m(t)$ and $C_s(t)$ at each time, the capacitance detection circuit 46 calculates capacitance increase rates $dC_m(t)$ and $dC_s(t)$. Furthermore, on the basis of the capacitance increase rates $dC_m(t)$ and $dC_s(t)$, the capacitance detection circuit 46 detects whether or not a deposit has reached a prescribed thickness.

Moreover, an applied voltage to be applied to the pair of electrodes 54 and 56 when measuring the capacitance of the main sensor 42 with the capacitance detection circuit 46 is set so as to be equal to or lower than 100 V In addition, an applied voltage to be applied to the pair of electrodes 68 and 70 when measuring the capacitance of the auxiliary sensor 44 with the capacitance detection circuit 46 is also set so as to be equal to or lower than 100 V. Furthermore, the capacitance detection circuit 46, the pair of electrodes 54 and 56 of the main sensor 42, and the pair of electrodes 68 and 70 of the auxiliary sensor 44 are only energized during detection of a capacitance and are interrupted between detections of capacitances.

In the present embodiment, a case will be described in which the outlet of the spiral groove 32a is set as the detection object position and the detection system 50 detects whether or not a deposit at the outlet of the spiral groove 32a has reached a prescribed thickness.

First, a principle by which the detection system according to the present embodiment detects whether or not a deposit has reached a prescribed thickness will be described.

A capacitance C of a pair of electrodes made of flat plate-shaped metal can be calculated by $C = \varepsilon_0 \times \varepsilon_s \times S/L$. In the equation described above, $\varepsilon_0$ denotes permittivity of vacuum, $\varepsilon_s$ denotes relative permittivity between a pair of electrodes, S denotes an area of the electrodes, and L denotes a distance between the electrodes.

Figure 7:
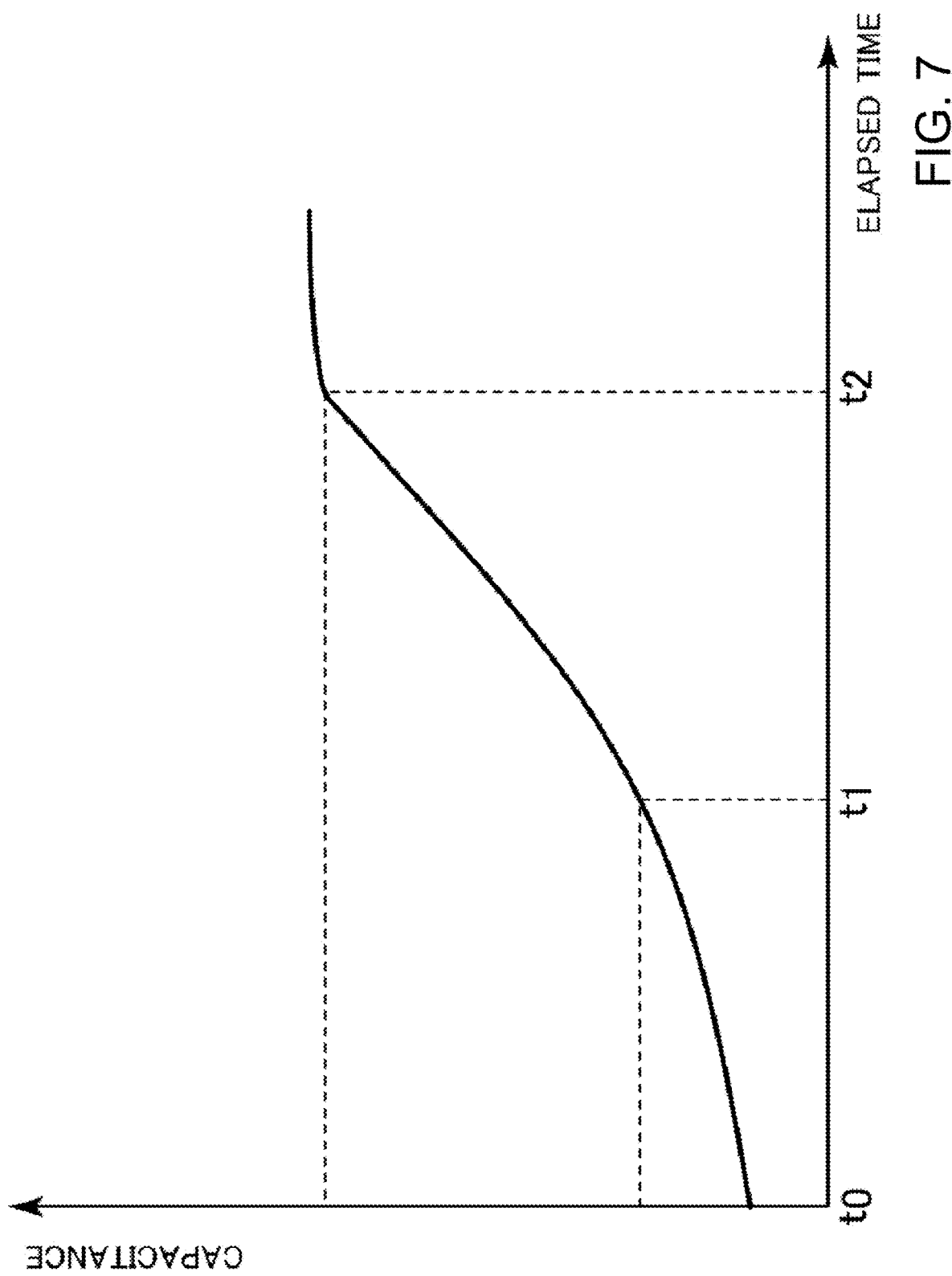
FIG. 7 is a graph showing a relationship between elapsed time and a capacitance of the pair of electrodes of the main sensor.

FIGS. 6A to 6C are diagrams showing how a deposited material accumulates on a pair of electrodes of the main sensor, and FIG. 7 is a graph showing a relationship between elapsed time and a capacitance of the pair of electrodes of the main sensor. It should be noted that elapsed time refers to a drive time of the vacuum pump when $t_0$ is assumed to be a time point where no deposited material has accumulated on the electrodes. As shown in FIG. 6A, at an initial time $t = t_0$, no deposited material has accumulated on the electrodes. Therefore, as shown in FIG. 7, gas to be sucked by the vacuum pump 1 is present between the pair of electrodes 54 and 56 of the main sensor 42 and the capacitance is a small value. Next, as shown in FIG. 6B, at time $t = t_1$, a deposited material A is deposited on surfaces of the electrodes 54 and 56. When a deposited material is deposited on surfaces of the electrodes 54 and 56 in this manner, since the relative permittivity $\varepsilon_s$ of the deposited material A is larger than gas which flows along the internal flow path 6 of the vacuum pump 1, the capacitance of the pair of electrodes 54 and 56 increases as shown in FIG. 7. As shown in FIG. 6B, as long as there is a gap present between deposited materials respectively deposited on the electrodes 54 and 56, the capacitance continues to increase. In comparison, at time $t = t_2$, when the gap is no longer present between the deposited materials A respectively deposited on the electrodes 54 and 56 as shown in FIG. 6C, since the relative permittivity $\varepsilon_s$ of the substance between the electrodes 54 and 56 no longer varies, an increase rate of the capacitance per unit time declines as shown in FIG. 7. In the detection system according to the present embodiment, capacitances at the main sensor 42 and the auxiliary sensor 44 are detected by the capacitance detection circuit 46, and when an increase rate of the capacitances per unit time declines, it is determined that a deposited material has accumulated on each of the electrodes 54, 56, 68, and 70 of the main sensor 42 and the auxiliary sensor 44 to a thickness corresponding to half of an interval of the respective electrodes.

An interval $d_m$ between the pair of electrodes 54 and 56 of the main sensor 42 and an interval $d_s$ between the pair of electrodes 68 and 70 of the auxiliary sensor 44 are determined as described below in correspondence to a prescribed thickness of the deposited material at the detection object position which is deemed dangerous. As described earlier, in the present embodiment, whether or not a deposit at the outlet of the spiral groove 32*a* has reached a prescribed thickness is detected. When the outlet of the spiral groove 32*a* and positions where the main sensor 42 and the auxiliary sensor 44 are provided are extremely close to each other, pressure and temperature of gas at the outlet of the spiral groove 32*a* and the positions where the main sensor 42 and the auxiliary sensor 44 are provided are more or less equal. In such a case, the interval $d_m$ between the electrodes 54 and 56 of the main sensor 42 is set to one to two times an interval between the rotating portion 14 and the stator portion 16 (in other words, an interval between the cylindrical portion 20B and a bottom portion of a groove of the spiral groove 32*a*) at the outlet of the spiral groove 32*a*. This setting is adopted in order to prevent a deposit accumulated on the stator portion 16 from coming into contact with the rotating portion 14 and damaging the rotating portion 14.

In addition, when the detection object position is separated from the positions where the main sensor 42 and the auxiliary sensor 44 are provided, the interval $d_m$ is determined in consideration of the pressure and temperature of gas at the detection object position and the pressure and temperature of gas at the positions where the main sensor 42 and the auxiliary sensor 44 are provided. This is because deposition amounts of components contained in gas differ depending on temperature and pressure.

In addition, the interval $d_s$ between the electrodes 68 and 70 of the auxiliary sensor 44 is set to a smaller interval than the interval $d_m$ between the electrodes 54 and 56 of the main sensor 42 such as 0.5 times the interval $d_m$ between the electrodes 54 and 56 of the main sensor 42. This setting is adopted in order to estimate a relative permittivity of the deposited material A on the basis of the capacitance of the auxiliary sensor 44 as will be described later.

Figure 8:
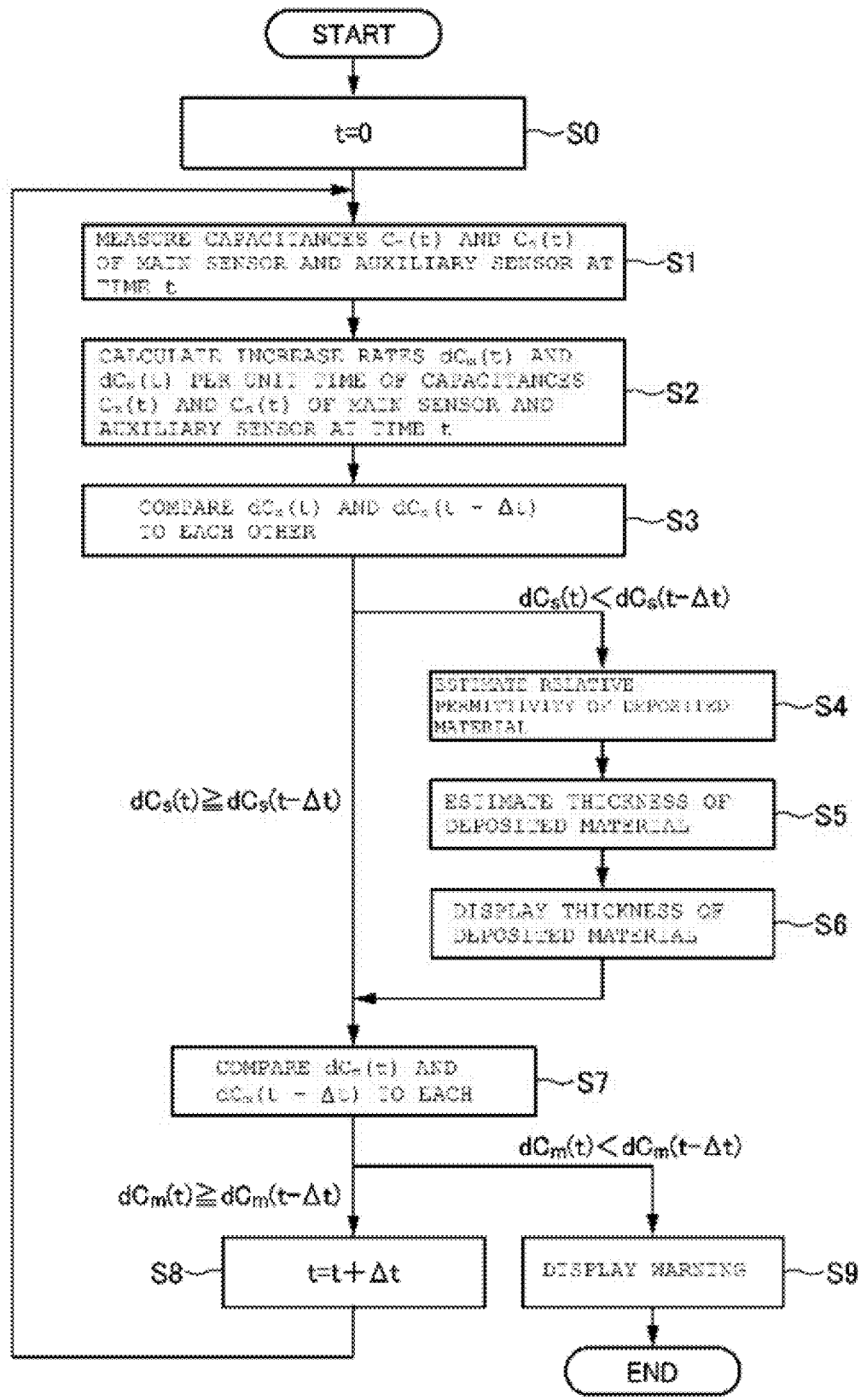
FIG. 8 is a flow chart for explaining a method of determining whether or not a deposited material at a detection object position has accumulated to a prescribed thickness.

Hereinafter, a method of determining, with the detection system of the vacuum pump according to the present embodiment, whether or not a deposited material at the detection object position has accumulated to a prescribed thickness will be described. FIG. 8 is a flow chart for explaining a method of determining whether or not a deposited material at the detection object position has accumulated to a prescribed thickness.

First, when using the vacuum pump for the first time or after performing maintenance for removing an internal deposited material, the cumulative drive time t of the capacitance detection circuit 46 is set such that t=0 and a measurement time $t_m$ of the capacitance detection circuit 46 is set such that $t_m$=0 (S0).

Next, when the cumulative drive time t reaches $t_m$, the capacitance detection circuit 46, the pair of electrodes 54 and 56 of the main sensor 42, and the pair of electrodes 68 and 70 of the auxiliary sensor 44 are switched to an energized state and capacitances $C_m(t)$ and $C_s(t)$ of the main sensor 42 and the auxiliary sensor 44 at time t are measured (SO. Once the measurement of the capacitances $C_m(t)$ and $C_s(t)$ of the main sensor 42 and the auxiliary sensor 44 are completed, connections between the capacitance detection circuit 46 and the pair of electrodes 54 and 56 of the main sensor 42 and the pair of electrodes 68 and 70 of the auxiliary sensor 44 are interrupted once again.

In addition, when t>0, on the basis of the measured capacitances $C_m(t)$ and $C_s(t)$ of the main sensor 42 and the auxiliary sensor 44, capacitance increase rates $dC_m(t)$ and $dC_s(t)$ at time t are calculated (S2). For example, the increase rate $dC_m(t)$ of the capacitance of the main sensor 42 may be calculated by $dC_m(t)=(C_m(t)-dC_m(t-\Delta t))/\Delta t$, and the increase rate $dC_s(t)$ of the capacitance of the auxiliary sensor 44 may be calculated by $dC_s(t)=(C_s(t)-dC_s(t-\Delta t))/\Delta t$.

Next, the increase rate $dC_s(t)$ of the capacitance of the auxiliary sensor 44 at time t and an increase rate $dC_s(t-\Delta t)$ of the capacitance of the auxiliary sensor 44 at time $t-\Delta t$ are compared to each other (S3). When the increase rate $dC_s(t)$ of the capacitance of the auxiliary sensor 44 at time t is equal to the increase rate $dC_s(t-\Delta t)$ of the capacitance of the auxiliary sensor 44 at time $t-\Delta t$ or larger than $dC_s(t-\Delta t)$ ($dC_s(t) \geq dC_s(t-\Delta t)$), the method advances to step (S7) for comparing the increase rate $dC_m(t)$ of the capacitance of the main sensor 42 at time t and an increase rate $dC_m(t-\Delta t)$ of the capacitance of the main sensor 42 at time $t-\Delta t$. Alternatively, in S3, when the increase rate $dC_s(t)$ of the capacitance of the auxiliary sensor 44 at time t is smaller than the increase rate $dC_s(t-\Delta t)$ of the capacitance of the auxiliary sensor 44 at time $t-\Delta t$ ($dC_s(t)<dC_s(t-\Delta t)$), since it is estimated that a space between the pair of electrodes 68 and 70 of the auxiliary sensor 44 has been filled with a deposit, the method advances to step (S4) for calculating a relative permittivity of a deposited material.

In step (S4) for calculating a relative permittivity of a deposited material, the relative permittivity $\varepsilon_s$ of a deposit accumulated between the pair of electrodes 68 and 70 of the auxiliary sensor 44 is calculated on the basis of the interval $d_s$ of the pair of electrodes 68 and 70 and the measured capacitance $C_s$ of the auxiliary sensor 44. The relative permittivity $e_s$ of the deposit can be calculated on the basis of, for example, the equation $C=\varepsilon_0 \times \varepsilon_s \times S/L$ given earlier. It should be noted that, although steps S1 to S8 are repeated until $dC_m(t)<dC_m(t-\Delta t)$ is satisfied in S7, step (S4) for calculating a relative permittivity of the deposited material can be omitted after having been performed once.

Next, a thickness of a deposit accumulated on the main sensor 42 is estimated on the basis of the calculated relative permittivity $\varepsilon_s$ described above and the capacitance $C_m(t)$ of the main sensor 42 (S5). Subsequently, the estimated thickness of the deposit accumulated on the main sensor 42 is displayed on the display apparatus 48. In doing so, for example, on the basis of a speed of accumulation of the deposit (an increase rate of the thickness of a deposited material per unit time), the display apparatus 48 may display how long the vacuum pump 1 must be driven for the space between the pair of electrodes 54 and 56 of the main sensor 42 to he blocked by the deposited material or, in other words, for the deposited material to be accumulated to the prescribed thickness at the detection object position.

Next, the increase rate $dC_m(t)$ of the capacitance of the main sensor 42 at time t and an increase rate $dC_m(t-\Delta t)$ of the capacitance of the main sensor 42 at time $t-\Delta t$ are compared to each other (S7). When the increase rate $dC_m(t)$ of the capacitance of the main sensor 42 at time t is equal to the increase rate $dC_m(t-\Delta t)$ of the capacitance of the main sensor 42 at time $t-\Delta t$ or larger than $dC_m(t-\Delta t)$ ($dC_m(t) \geq dC_m(t-\Delta t)$), it is assumed that $t_m=t_m+\Delta t$ (S8), and the method returns to S2.

Alternatively, when $dC_m(t)<dC_m(t-\Delta t)$ is satisfied in S7, the capacitance detection circuit 46 determines that the space between the pair of electrodes 54 and 56 of the main sensor 42 has been filled by a deposited material and uses the display apparatus 48 to display the fact that the deposited material at the detection object position of the internal flow path 6 has reached the prescribed thickness. When the fact that the deposited material at the detection object position of the internal flow path 6 has reached the prescribed thickness is displayed on the display apparatus 48, a worker disassembles the vacuum pump 1 and performs maintenance. It should be noted that S7 can also be omitted until a determination of $dC_s(t)<dC_s(t-\Delta t)$ is made in S3.

As described above, when a gap is present between a deposit accumulated on the pair of electrodes 54 and 56 constituting the main sensor 42, capacitance increases as the vacuum pump 1 is driven and a deposited material accumulates. in comparison, when the space between the pair of electrodes 54 and 56 constituting the main sensor 42 is filled by the deposit material and the gap is no longer present, the capacitance between the electrodes 54 and 56 subsequently hardly increases even when the vacuum pump 1 is driven. Therefore, according to the present embodiment, a state where the space between the pair of electrodes 54 and 56 of the main sensor 42 is filled by a deposited material can be detected when the capacitance detection circuit 46 detects that the increase rate of the capacitance of the pair of electrodes 54 and 56 has dropped and, accordingly, it can be detected that a deposited material inside the internal flow path 6 has reached the prescribed thickness regardless of a chemical composition of the deposited material.

In addition, in the embodiment described above, the interval of the pair of electrodes 54 and 56 of the main sensor 42 is set to one to two times the interval between the rotating portion 14 and the stator portion 16 at the detection object position. Since the deposited material A accumulates on the surface of each of the electrodes 54 and 56, at a time point where the increase rate of the capacitance has dropped, it can be estimated that the deposited material has accumulated on each of the electrodes 54 and 56 to a thickness that is half the distance between the electrodes. Therefore, when simply detecting whether or not the space between the rotating portion 14 and the stator portion 16 of the electrodes 54 and 56 is blocked, the interval of the electrodes 54 and 56 may conceivably be set to twice the interval between the rotating portion 14 and the stator portion 16 at the detection object position. However, once a deposit accumulates to such an extent that the space between the rotating portion 14 and the stator portion 16 is blocked, there is a risk that the rotating portion 14 may sustain damage from the deposit. In comparison, according to the embodiment described above, since the interval between the electrodes 54 and 56 is set to one to two times the interval between the rotating portion 14 and the stator portion 16 at the detection object position, it can be detected that the deposited material has accumulated to the prescribed thickness before the space between the rotating portion 14 and the stator portion 16 is blocked.

In addition, in the embodiment described above, since the pair of electrodes 54 and 56 have a flat plate shape and are arranged in parallel, it can be determined that the thickness of the deposited material having accumulated between the flat plate-shaped electrodes 54 and 56 has reached the prescribed thickness.

A deposit is most likely to accumulate between the outlet of the exhaust mechanism 8 and the outlet port 4 of the vacuum pump 1. In comparison, in the embodiment described above, since the main sensor 42 is disposed inside the outlet port-side flow path 40 which connects the outlet of the exhaust mechanism 8 and the outlet port 4 of the vacuum pump 1, failures caused by an accumulation of a deposit can be reliably prevented.

A deposit accumulates in the portion farthest from the outlet port 4 of the vacuum pump 1 in the outlet port-side flow path 40. In comparison, in the embodiment described above, since the main sensor 42 is disposed in the portion farthest from the outlet port 4 of the vacuum pump 1 in the outlet port-side flow path 40, failures caused by an accumulation of a deposit can be reliably prevented.

Furthermore, according to the embodiment described above, since the pair of electrodes 54 and 56 are disposed so as to extend in a flow direction of gas that flows inside the internal flow path 6, gas flows smoothly between the electrodes and the sensor can be prevented from interrupting the flow of the gas.

Pressure rises in the vicinity of the outlet of the thread groove pump portion S. Since a deposit is more likely to be deposited at locations with high pressure, the thickness of the deposit cannot be accurately detected if there is a large difference in pressure between the detection object position and the position where the main sensor 42 is provided. In comparison, according to the embodiment described above, since the notch 32b is provided as a gas vent hole in the vicinity of the outlet of the spiral groove 32a of the thread groove pump portion S, the difference in pressure between the vicinity of the outlet of the thread groove pump portion S and the position where the main sensor 42 is provided can be reduced and the thickness of the deposit can be detected with greater accuracy.

According to the embodiment described above, the vacuum pump 1 further has the auxiliary sensor 44 including the pair of electrodes 68 and 70 which are disposed inside the internal flow path 6 and which are connected to the capacitance detection circuit 46, wherein an interval between the pair of electrodes 68 and 70 of the auxiliary sensor 44 is set shorter than the interval between the pair of electrodes 54 and 56 of the main sensor 42. Accordingly, a permittivity of a deposit can be obtained on the basis of a capacitance at a time point where a space in the auxiliary sensor 44 is filled with the deposit, and the thickness of the deposit accumulated on the electrodes 54 and 56 of the main sensor 42 can be estimated on the basis of the permittivity of the deposit and the capacitance between the electrodes 54 and 56 of the main sensor 42.

According to Paschen's Law, there is a risk that an electrical discharge may occur under pressure inside the internal flow path 6 of the vacuum pump 1 when the applied voltage between the electrodes exceeds 100 V. In comparison, according to the embodiment described above, since the applied voltage between the electrodes 54 and 56 is equal to or lower than 100 V, an occurrence of an electrical discharge between the electrodes 54 and 56 can be prevented.

According to the embodiment described above, since an insulating layer is formed on surfaces of the pair of electrodes 54 and 56 of the main sensor 42, even if a conducting substance accumulates on the surfaces of the electrodes 54 and 56, a short circuit can be prevented from occurring between the electrodes 54 and 56.

A reactive substance in powder form and a gaseous reaction raw material may become charged, and a deposit is likely to accumulate on electrodes charged to an opposite charge. In comparison, according to the embodiment described above, since the capacitance detection circuit 46 and the pair of electrodes 54 and 56 of the main sensor 42 are only energized during detection, a particle can be prevented from becoming more likely to accumulate on the electrodes 54 and 56.

Although plate-shaped members are used as the pairs of electrodes of the main sensor 42 and the auxiliary sensor 44 in the embodiment described. above, shapes of the pairs of electrodes are not limited thereto. FIGS. 9A and 9B each show a shape of a pair of electrodes of a main sensor according to another embodiment, in which FIG. 9A is a sectional view taken along a plane perpendicular to a central axis and FIG. 9B is a sectional view taken along a plane along the central axis. As shown in FIGS. 9A and 9B, as electrodes of the main sensor 42 and the auxiliary sensor 44, concentrically and coaxially disposed cylindrical metal members 154 and 156 with different radii may be used. When detecting that a deposited material has reached a prescribed thickness at the detection object position using such electrodes, a difference between an inner diameter of an outer cylindrical metal member 154 and an outer diameter of an inner cylindrical metal member 156 may be set to an interval corresponding to the prescribed thickness.

According to the embodiment described above, it can be determined that the thickness of a deposited material having accumulated between the cylindrical electrodes (the metal members 154 and 156) have reached the prescribed thickness.

Although the thread groove stator 32 is a cylindrical member with the spiral groove 32a formed on an inner circumferential surface thereof in the embodiment described above, this configuration is not restrictive and, alternatively, the spiral groove 32a may be formed on an outer circumferential surface of the cylindrical portion 20B while the inner circumferential surface of the thread groove stator 32 may be free of grooves.

In addition, in a case where the thread groove stator 32 is disposed on an inner side of the cylindrical portion 20B, the spiral groove 32a is formed on an outer circumferential surface.

It should be noted that, in addition to a composite vacuum pump that combines the turbo-molecular pump portion and the thread groove pump portion described above, the main sensor and the vacuum pump related to the present invention can also be applied to a vacuum pump solely constituted by the turbo-molecular pump portion.

Furthermore, configurations which appropriately combine the embodiment and respective modifications of the present invention may be adopted. Moreover, it will be obvious to those skilled in the art that various changes and modifications may be made without departing from the spirit of the present invention and that the present invention also encompasses such changes and modifications.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

What is claimed is:

1. A vacuum pump, comprising: a rotating portion and a stator portion between which an internal flow path is formed; an exhaust mechanism which sends gas from a suction port toward an outlet port through the internal flow path; and a main sensor for detecting that a deposited material has reached a prescribed thickness at a detection object position of the internal flow path, wherein
the main sensor includes:
at least a pair of electrodes disposed in the internal flow path at an interval corresponding to the prescribed thickness; and
a capacitance detection circuit which is connected to the pair of electrodes and which detects a capacitance between the pair of electrodes, and
the capacitance detection circuit is configured to determine a rate of change of the capacitance between the pair of electrodes and to detect that a deposited material in the internal flow path has reached the prescribed thickness on the basis of a drop in the rate of change of the capacitance.

2. The vacuum pump according to claim 1, wherein the interval of the pair of electrodes is set to one to two times an interval between the rotating portion and the stator portion at the detection object position.

3. The vacuum pump according to claim 1, wherein the pair of electrodes have a flat plate shape and are disposed in parallel.

4. The vacuum pump according to claim 1, wherein the pair of electrodes have a cylindrical shape and are disposed concentrically and coaxially.

5. The vacuum pump according to claim 1, wherein the main sensor is disposed inside an outlet port-side flow path which connects an outlet of the exhaust mechanism and an outlet port of the vacuum pump to each other.

6. The vacuum pump according to claim 5, wherein the main sensor is disposed at a portion farthest from the outlet port of the vacuum pump in the outlet port-side flow path.

7. The vacuum pump according to claim 1, wherein the pair of electrodes are disposed so as to extend in a flow direction of gas that flows inside the internal flow path.

8. The vacuum pump according to claim 1, wherein
the exhaust mechanism includes a thread groove pump in a rearmost stage thereof, and
a gas vent hole is provided in a vicinity of an outlet of the thread groove pump.

9. The vacuum pump according to claim 1, further comprising an auxiliary sensor including a pair of electrodes which are disposed inside the internal flow path and which are connected to the capacitance detection circuit, wherein
an interval between the pair of electrodes of the auxiliary sensor is set shorter than the interval between the pair of electrodes of the main sensor.

10. The vacuum pump according to claim 1, being configured such that an applied voltage between the pair of electrodes of the main sensor is equal to or lower than 100 V.

11. The vacuum pump according to claim 1, wherein an insulating layer is formed on a surface of the pair of electrodes of the main sensor.

12. The vacuum pump according to claim 1, wherein the capacitance detection circuit and the pair of electrodes of the main sensor are only energized during detection.

13. A main sensor comprising:
at least a pair of electrodes disposed in an internal flow path formed between a rotating portion and a stator portion of a vacuum pump at an interval corresponding to a prescribed thickness for deposited material;
a capacitance detection circuit which is connected to the pair of electrodes and which detects a capacitance between the pair of electrodes, and
wherein the capacitance detection circuit is configured to determine a rate of change of the capacitance between the pair of electrodes and to detect that deposited material in the internal flow path has reached the prescribed thickness on the basis of a drop in the rate of change of the capacitance.

14. A thread groove stator of a thread groove pump in a vacuum pump, the thread groove stator comprising a gas vent hole in a vicinity of an outlet of the thread groove pump wherein the gas vent hole is positioned proximate a main sensor that comprises:
- at least a pair of electrodes disposed at an interval corresponding to a prescribed thickness for a deposited material; and
- a capacitance detection circuit which is connected to the pair of electrodes and which detects a capacitance between the pair of electrodes, wherein the capacitance detection circuit is configured to determine a rate of change of the capacitance between the pair of electrodes and to detect that the deposited material has reached the prescribed thickness on the basis of a drop in the rate of change of the capacitance.

* * * * *